(12) United States Patent
Ro et al.

(10) Patent No.: US 12,111,401 B2
(45) Date of Patent: Oct. 8, 2024

(54) PERSONAL MOBILITY DEVICE, SERVER FOR COMMUNICATING WITH THE SAME, AND METHOD OF CONTROLLING THE SERVER

(71) Applicants: Hyundai Motor Company, Seoul (KR); Kia Corporation, Seoul (KR)

(72) Inventors: Hee Jin Ro, Seoul (KR); Yocheol Jang, Suwon-si (KR); Duck Young Kim, Seongnam-si (KR); Donghee Seok, Suwon-si (KR); Ilsun Song, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 413 days.

(21) Appl. No.: 17/537,767

(22) Filed: Nov. 30, 2021

(65) Prior Publication Data
US 2022/0236424 A1    Jul. 28, 2022

(30) Foreign Application Priority Data

Jan. 27, 2021  (KR) .......................... 10-2021-0011172

(51) Int. Cl.
*G01S 19/07*       (2010.01)
*G01S 19/42*       (2010.01)
(Continued)

(52) U.S. Cl.
CPC .............. *G01S 19/07* (2013.01); *G01S 19/42* (2013.01); *G06V 10/762* (2022.01);
(Continued)

(58) Field of Classification Search
CPC ........ G01S 19/07; G01S 19/071; G01S 19/40; G01S 19/41; G01S 19/42; G01S 19/43;
(Continued)

(56) References Cited

U.S. PATENT DOCUMENTS

| 10,303,181 B1* | 5/2019 | Wengreen ............... G01S 19/42 |
| 2007/0027624 A1* | 2/2007 | Powe ...................... G01S 19/07 |
| | | 342/357.44 |

(Continued)

FOREIGN PATENT DOCUMENTS

| CA | 2296812 A1 * | 8/2000 | ............... G01S 5/12 |
| CN | 105163385 A * | 12/2015 | ............ H04W 4/023 |

(Continued)

OTHER PUBLICATIONS

L. Yang et al., An Innovative Approach for Atmospheric Error Mitigation Using New GNSS Signals, The Journal of Navigation, vol. 64, p. S211-S232 (Year: 2011).*

*Primary Examiner* — Bernarr E Gregory
*Assistant Examiner* — Fred H Mull
(74) *Attorney, Agent, or Firm* — Slater Matsil, LLP

(57) ABSTRACT

An embodiment personal mobility device includes a location receiver configured to receive signals from a plurality of satellites to recognize location information, a communication module configured to perform communication in a different communication method than the location receiver and to communicate with an external communication device and a server, and a controller configured to obtain initial location information based on the signals received by the location receiver and control the initial location information to be transmitted to the server, in response to receipt of communication information by a communication module, cause the communication information to be transmitted to the server, and in response to receipt of corrected storage location information from the server, cause the received corrected storage location information to be stored.

17 Claims, 13 Drawing Sheets

(51) Int. Cl.
  *G06V 10/762* (2022.01)
  *H04B 17/318* (2015.01)
  *H04W 4/02* (2018.01)
  *H04W 4/40* (2018.01)
  *H04W 4/80* (2018.01)

(52) U.S. Cl.
  CPC .......... *H04B 17/318* (2015.01); *H04W 4/023* (2013.01); *H04W 4/025* (2013.01); *H04W 4/40* (2018.02); *H04W 4/80* (2018.02)

(58) Field of Classification Search
  CPC .... H04B 17/318; H04W 4/023; H04W 4/025; H04W 4/40; H04W 4/80; H04W 64/00
  See application file for complete search history.

(56) References Cited

U.S. PATENT DOCUMENTS

| | | | | |
|---|---|---|---|---|
| 2008/0227463 A1* | 9/2008 | Hizume | ................ | H04W 64/00 |
| | | | | 455/456.1 |
| 2012/0286991 A1* | 11/2012 | Chen | ................ | G01S 19/44 |
| | | | | 342/357.23 |
| 2015/0168560 A1* | 6/2015 | Ralphs | ................ | G01S 19/14 |
| | | | | 701/23 |
| 2016/0116601 A1* | 4/2016 | Horn | ................ | G01S 19/51 |
| | | | | 342/357.27 |
| 2019/0360825 A1* | 11/2019 | Wang | ................ | G06Q 20/327 |

FOREIGN PATENT DOCUMENTS

| | | | | |
|---|---|---|---|---|
| CN | 110488292 A | * | 11/2019 | .......... G01S 13/882 |
| JP | 2016194417 A | * | 11/2016 | |

\* cited by examiner

PERSONAL MOBILITY DEVICE, SERVER FOR COMMUNICATING WITH THE SAME, AND METHOD OF CONTROLLING THE SERVER

CROSS-REFERENCE TO RELATED APPLICATIONS

This application claims the benefit of Korean Patent Application No. 10-2021-0011172, filed on Jan. 27, 2021, which application is hereby incorporated herein by reference.

TECHNICAL FIELD

The disclosure relates to a personal mobility device, server for communicating with the personal mobility device, and method of controlling the server.

BACKGROUND

With environmental regulations and growth of big cities, more and more individual vehicles called personal mobility devices are being developed these days. The personal mobility device is a short- and mid-range compact mobility vehicle to which convergence of electric charging and power technologies is applied, and is also referred to as a smart mobility device or micromobility device.

As the personal mobility device is powered by electricity, it does not emit environmental pollutants.

The personal mobility device is also in the spotlight as a transporter that is easy to carry and as a solution for traffic congestion and parking problems.

The personal mobility device may be individually owned, or may be shared through rental services. That is, the user may use the personal mobility device by renting it through a sharing service.

SUMMARY

The disclosure relates to a personal mobility device, a server for communicating with the personal mobility device, and a method of controlling the server. Particular embodiments relate to a personal mobility device, a server for communicating with the personal mobility device, and a method of controlling the server, capable of providing storage location information for the user.

Embodiments of the disclosure provide a personal mobility device that obtains storage location information about a storage location by using a communication module for performing communication in different communication methods or obtains storage location information from a server.

Embodiments of the disclosure also provide a server and a method of controlling the server, which provides storage location information about a storage location of a personal mobility device for the personal mobility device and a user equipment.

Embodiments of the disclosure also provide a server and a method of controlling the server, which corrects storage location information about a storage location of a personal mobility device based on weather information and provides the corrected storage location information of the personal mobility device for the personal mobility device and a user equipment.

Embodiments of the disclosure also provide a server and a method of controlling the server, which corrects storage location information of a personal mobility device whose accuracy is less than a reference accuracy based on storage location information of at least one personal mobility device whose accuracy is equal to or greater than the reference accuracy.

Embodiments of the disclosure also provide a server and a method of controlling the server, which establishes a clustering area using at least one personal mobility device whose accuracy of storage location information is equal to or greater than a reference accuracy and corrects storage location information of a personal mobility device whose accuracy is less than the reference accuracy based on the established clustering area.

According to an embodiment of the disclosure, a personal mobility device includes a location receiver configured to receive signals from a plurality of satellites to recognize location information, a communication module configured to perform communication in a different communication method from the location receiver and communicate with an external communication device and a server, and a controller configured to obtain initial location information based on signals received by the location receiver and control the initial location information to be transmitted to the server, when communication information is received by a communication module, control the communication information to be transmitted to the server, and when corrected storage location information is received from the server, control the storage location information to be stored.

The communication information of the personal mobility device may include at least one of medium access control (MAC) address information or Internet protocol (IP) address information and further comprises information about received signal strength.

The personal mobility device may further include an input module configured to receive a user input, and the controller is configured to attempt connection for communication with an external communication device when a completion command is received through the input module, transmit the communication information and the initial location information to the server when connection for communication with the external communication device is made, and transmit the initial location information to the server when connection for communication with the external communication device is not made.

The communication module of the personal mobility device may include at least one of a Bluetooth module, a Zigbee module, or a wireless-fidelity (Wi-Fi) module.

According to another embodiment of the disclosure, a server includes a communication module and a controller configured to recognize a personal mobility device which has transmitted storage location information including communication information and initial location information among storage location information of a plurality of personal mobility devices received through the communication module as a first personal mobility device, recognize a personal mobility device which has transmitted storage location information including the initial location information as a second personal mobility device, obtain location error information based on the communication information and the initial location information of the first personal mobility device, correct the initial location information of the second personal mobility device based on the location error information, and transmit the corrected initial location information to the second personal mobility device.

The controller of the server may be configured to correct the initial location information of the first personal mobility device based on the location error information and transmit the corrected initial location information to the first personal mobility device.

The controller of the server may be configured to transmit the corrected initial information of the first personal mobility device and the corrected initial location information of the second personal mobility device to a server for a sharing service company.

The controller of the server is configured to correct the location error information based on weather information when the weather information is received through the communication module.

The controller of the server is configured to set a radius based on the location error information and the weather information and establish a clustering area based on the set radius and the corrected initial location information of the first personal mobility device, and correct the initial location information of the second personal mobility device in the established clustering area based on the location error information.

The controller of the server is configured to determine whether there is a plurality of other first personal mobility devices within a reference distance to the first personal mobility device based on the corrected initial location information of the first personal mobility device, when it is determined that there are the plurality of other first personal mobility devices, obtain average location error information based on location error information of the plurality of other first personal mobility devices, set the average location error information to location error information of a virtual first personal mobility device, and correct the initial location information of the second personal mobility device based on the set location error information of the virtual first personal mobility device.

The controller of the server is configured to obtain information about a distance between two of the plurality of first personal mobility devices with corrected initial location information based on the initial location information of the two first personal mobility devices, and when the distance between the two first personal mobility devices is equal to or longer than double a preset radius based on the obtained distance information, establish a clustering area having a preset radius from a location of each of the two first personal mobility devices.

The controller of the server is configured to obtain information about a distance between two of the plurality of first personal mobility devices with corrected initial location information based on the initial location information of the two first personal mobility devices, and when the distance between the two first personal mobility devices is shorter than double a preset radius based on the obtained distance information, establish a clustering area having a radius corresponding to the distance information from a location of each of the two first personal mobility devices.

The controller of the server is configured to exclude an area corresponding to an obstacle from the established clustering area when the obstacle is present in the established clustering area.

The controller of the server is configured to set a maximum radius as a radius for the clustering area when parts of a plurality of clustering areas are overlapped.

The controller of the server is configured to obtain average location error information based on location error information of first personal mobility devices in two clustering areas when there is a second personal mobility device present in an overlapping region between the two clustering areas, and correct initial location information of the second personal mobility device in the overlapping region based on the average location error information.

The communication information of the server may include at least one of a MAC address or an IP address, and may further include information about received signal strength.

The controller of the server is configured to identify at least one of the MAC address or the IP address in the communication information received at the first personal mobility device, determine location information of an external communication device based on the at least one of the MAC address or the IP address, obtain distance information corresponding to received signal strength in the communication information received at the first personal mobility device, and obtain location error information for initial location information of the first personal mobility device based on the location information of the external communication device and the distance information.

According to another embodiment of the disclosure, a method of controlling a server includes recognizing a personal mobility device which has transmitted storage location information including communication information and initial location information among storage location information of a plurality of personal mobility devices received through a communication module as a first personal mobility device, recognizing a personal mobility device which has transmitted storage location information including only the initial location information as a second personal mobility device, obtaining location error information based on the communication information and the initial location information of the first personal mobility device, correcting the initial location information of the second personal mobility device based on the location error information, and transmitting the corrected initial location information to the second personal mobility device.

The correcting of the initial location information of the second personal mobility device may include obtaining information about a distance between two of the first personal mobility devices with corrected initial location information among the plurality of first personal mobility devices based on the initial location information of the two first personal mobility devices, and establishing a clustering area based on the distance information, identifying the second personal mobility device present in the established clustering area, and correcting the initial location information of the second personal mobility device based on the location error information of the two first personal mobility devices.

The method may further include correcting the location error information of the first personal mobility device based on weather information when the weather information is received through the communication module.

BRIEF DESCRIPTION OF THE DRAWINGS

The above and other objects, features and advantages of embodiments of the present disclosure will become more apparent to those of ordinary skill in the art by describing in detail exemplary embodiments thereof with reference to the accompanying drawings, in which.

DETAILED DESCRIPTION OF ILLUSTRATIVE EMBODIMENTS

Figure 1:
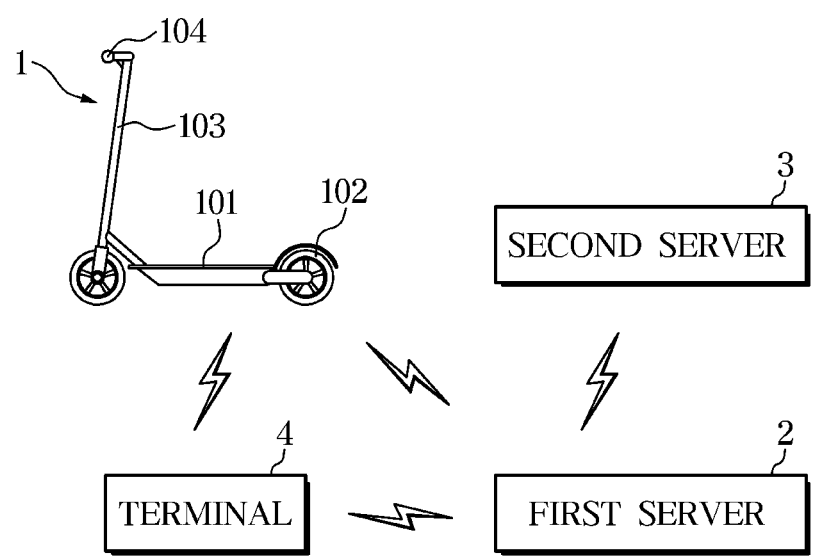
FIG. 1 illustrates a personal mobility device and a first sever communicating with the personal mobility device, according to an embodiment of the disclosure.

Embodiments of the disclosure will now be described in detail with reference to the accompanying drawings.

Like numerals refer to like elements throughout the specification. Not all elements of embodiments of the disclosure will be described, and description of what are commonly known in the art or what overlap each other in the embodiments will be omitted. The term unit, module, or device may refer to what is implemented in software or hardware, and a plurality of units, modules, or devices may be integrated in one component or the unit, module, or device may include a plurality of components, depending on the embodiment of the disclosure.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and embodiments of the disclosure will now be described with reference to the accompanying drawings.

FIG. 1 illustrates a personal mobility device and servers communicating with the personal mobility device, according to an embodiment of the disclosure.

A personal mobility device 1 is also referred to as a micromobility device, and may include at least one of a bike, a scooter, an electronic bicycle, a two-wheel drive kickboard, or a one-wheel drive kickboard.

The personal mobility device 1 includes a board 101 on which the user may stand on his/her feet, one or more wheels 102 arranged underneath the board 101 or on the front and back of the board 101, a support 103 coupled to the wheel 102 and the board 101 and transmitting force corresponding to an intention of steering of the user to the wheel 102, and a handle 104 coupled to the support 103, receiving force corresponding to an intention of steering of the user and allowed to be gripped by the user.

The personal mobility device 1 may further include a brake pedal (or brake button) pushed by the user according to an intention of braking of the user, and an accelerator pedal (or accelerator button) pushed by the user according to an intention of acceleration of the user.

The personal mobility device 1 may include a driving device such as a power generating device, a braking device, a steering device, etc., for applying driving power and braking power to one or more wheels 102. The power generating device may include a battery and/or a motor.

The personal mobility device 1 may obtain current location information (i.e., storage location information) after completion of driving and transmit the storage location information to at least one of a terminal 4 or a first server 2. The completion of driving may refer to a parked state in which the user is not using the personal mobility device 1.

The personal mobility device 1 may perform global positioning system (GPS) communication to obtain the storage location information after completion of driving, and may further perform communication with a communication module located on the periphery based on a communication scheme other than the GPS communication.

For example, the communication module based on the other communication scheme may be a Bluetooth beacon communication module, a wireless fidelity (Wi-Fi) communication module, or a Zigbee communication module.

When communicating with the Bluetooth beacon or Wi-Fi communication module, the personal mobility device 1 may receive medium access control (MAC) address information, received signal strength information, Internet protocol (IP) address information, etc., from the Bluetooth beacon or Wi-Fi communication module.

The personal mobility device 1 may determine whether the storage location information is accurate, and when it is determined that the storage location information is accurate, transmit the storage position information to the terminal 4.

Determining that the storage location information is accurate may include determining that the storage location information is accurate when the storage location information has been obtained by at least two communication schemes.

Determining that the storage location information is accurate may include determining that an accuracy of the storage location information is high, which includes obtaining an error between a storage location obtained based on the obtained storage location information and an actual storage location obtained based on actual storage location information and determining that the obtained error is smaller than a reference error.

Determining that the storage location information is accurate may include determining that an accuracy of the storage location information based on the obtained error and the reference error is equal to or greater than a reference accuracy.

On the other hand, determining that the storage location information is not accurate may include determining that the accuracy of the storage location information based on the obtained error and the reference error is less than the reference accuracy.

When the personal mobility device 1 transmits the storage location information to the first server 2 after the driving is completed, GPS location information recognized from the GPS may be transmitted as the storage location information, wherein the GPS location information is initial location information.

When the personal mobility device 1 transmits the storage location information to the first server 2 after the driving is completed, communication information recognized through a communication module based on a communication scheme other than the GPS may be transmitted to the first server 2 as the storage location information.

When the communication module based on the other communication scheme performs Bluetooth beacon or Wi-Fi communication, the communication information may include at least one of MAC address information, received signal strength information, or IP address information.

The first server 2 may determine whether the personal mobility device 1 has accurate storage location information or inaccurate storage location information based on the storage location information received from the personal mobility device 1.

The first server 2 may determine that the personal mobility device 1 has inaccurate storage location information when the first server 2 receives only GPS location information as the storage location information, and that the personal mobility device 1 has accurate storage location information when the first server 2 receives both the GPS location information and the communication information for the storage location information. Hereinafter, a personal mobility device having accurate storage location information is denoted as a first personal mobility device, which is a known personal mobility (KPM) device, and a personal mobility device having inaccurate storage location information is denoted as a second personal mobility device, which is an unknown personal mobility (UPM) device.

The first server 2 may correct storage location information of the second personal mobility device based on storage location information of the first personal mobility device. A configuration related to this will be described later.

The first server 2 may be a server for a company that has manufactured and manages the personal mobility device 1.

Alternatively, the first server 2 may be a server for a company that has manufactured and serves the terminal 4, or a location tracking server that tracks a location of the personal mobility device 1 and provides location information about the tracked location.

The first server 2 may be a server for a sharing service company that allows the personal mobility device 1 to be used by sharing.

Alternatively, the server for the sharing service company may be provided separately from the first server 2. In this case, the server for the sharing service company may receive and store identity information and storage location information of the personal mobility device 1 entered by an administrator or a distributor, and transmit the identity information and storage location information to the first server 2.

The administrator or distributor may enter the identity information and storage location information to a terminal for administration (not shown), or directly enter the storage location information through the personal mobility device 1. In this case, the personal mobility device 1 may transmit the storage location information entered by the administrator or distributor to the server for the sharing service company or to the first server 2.

A second server 3 may be a server for providing weather information such as regional weather (or weather by location), date and time. That is, the second server 3 may be a weather server. The second server 3 may provide, as the weather information, information about temperature, humidity, rainfall, a wind direction, wind velocity, etc., as well as whether there is lightning, typhoon, heavy rain, a cold front, or heavy snowfall.

The terminal 4 may be implemented by a computer or a portable terminal capable of accessing the personal mobility device 1 or the first server 2 over a network. The computer may include e.g., a notebook, laptop, tablet personal computer (tablet PC), slate PC, etc., having a WEB browser installed therein, and the portable terminal may be a wireless communication device that ensures portability and mobility, including any type of handheld based wireless communication device, such as a Personal Communication System (PCS), a Global System for Mobile communications (GSM), a Personal Digital Cellular (PDC), a Personal Handyphone System (PHS), a Personal Digital Assistant (PDA), an International Mobile Telecommunication (IMT)-2000 device, a Code Division Multiple Access (CDMA)-2000 device, a W-CDMA device, a Wireless Broadband Internet (WiBro) terminal, a smart phone, etc., and a wearable device, such as a watch, a ring, a bracelet, a necklace, glasses, a contact lens, a head mounted device (HMD), etc.

The wearable device may be any device that may be worn on the body or clothing of the user, and may include, for example, a smart watch, a smart band, a wearable computer, Google glass, a Bluetooth headset, Smart wear, etc.

The terminal 4, which is the wearable device, may perform communication with the personal mobility device 1 and the first server 2 while the terminal 4 is worn on the body of the user.

The terminal 4 may store and run an application to make reservations to use the personal mobility device 1, receive reservation information of the personal mobility device 1 during execution of the application, and transmit the received reservation information and user information of the personal mobility device 1 to the personal mobility device 1.

The terminal 4 may transmit the received reservation information and user information of the personal mobility device 1 to the first server 2.

Figure 2:
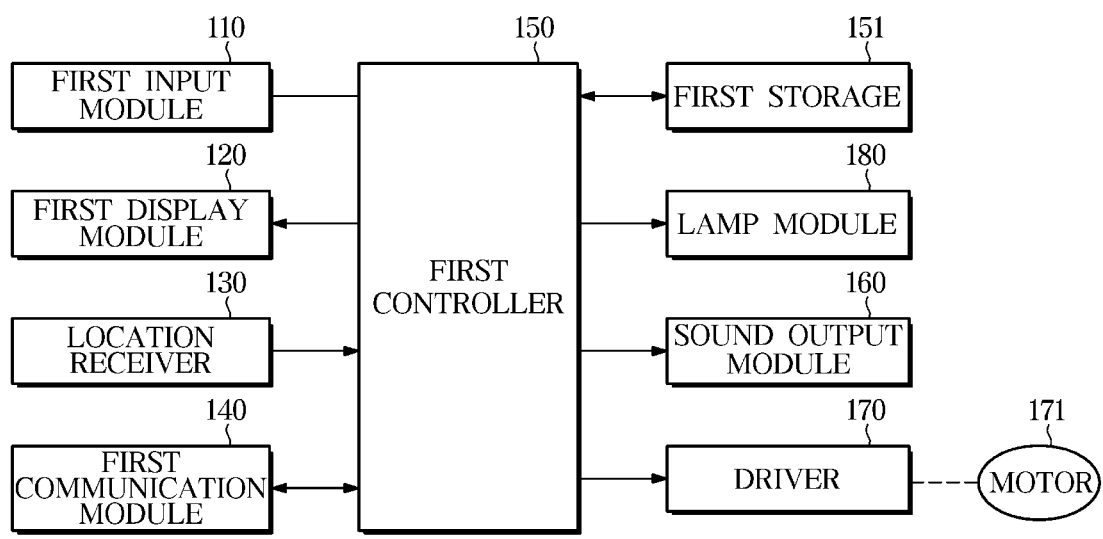
FIG. 2 is a control block diagram of a personal mobility device, according to an embodiment of the disclosure.

FIG. 2 is a control block diagram of a personal mobility device, according to an embodiment of the disclosure.

The personal mobility device 1 may include a first input module 110, a first display module 120, a location receiver 130, a first communication module 140, a first controller 150, a first storage 151, a sound output module 160, a driver 170, and a lamp module 180.

To distinguish components with the same name between the personal mobility device 1 and the first server 2, the word 'first' is added in front of the name of the component of the personal mobility device 1.

The first input module 110 may receive an operation command for any function to be performed in the personal mobility device 1.

The first input module 110 may be equipped at the handle 104 for receiving a user input from the user.

When the personal mobility device 1 has a navigation function, the first input module 110 may receive destination information and target speed information.

The first input module 110 may receive a power on/off command for the personal mobility device 1, a driving on/off command for the personal mobility device 1, a command for authentication with the terminal 4, or a command for pairing with the terminal 4.

The first input module 110 may also receive a start command, a stop command, a brake command, a steering command, a deceleration command, an acceleration command, a termination command, speed information, etc.

The first input module 110 may include many different buttons or switches, a pedal, a keyboard, a mouse, a track ball, various levers, a handle, a stick, or some hardware devices for the user input.

The first input module 110 may also include a graphical user interface (GUI), i.e., a software device, such as a touch pad for the user input.

The first display module 120 may display information about various functions performed in the personal mobility device 1.

The first display module 120 may receive a user input for at least one of a navigation function, an audio function, a video function, a radio tuner function, a web surfing function, a broadcast function (i.e., digital multimedia broadcasting (DMB)) function, or an Internet function, and display information about the at least one function in operation.

The first display module 120 is able to display status information about a storage state and an abnormal state of the personal mobility device 1, and further display billing information about the usage of the personal mobility device 1.

The first display module 120 is also able to display driving on/off information of the personal mobility device 1, information about authentication with a terminal, and information about connection with the terminal 4 for communication.

The first display module 120 may be provided on the handle 104.

The first display module 120 may include a cathode ray tube (CRT), a digital light processing (DLP) panel, a plasma display panel (PDP), a liquid crystal display (LCD) panel, an electro luminescence (EL) panel, an electrophoretic display (EPD) panel, an electrochromic display (ECD) panel, a light emitting diode (LED) panel, an organic light emitting diode (OLED) panel, etc., but is not limited thereto.

The first display module 120 may be used for the first input module no when implemented with a touch screen panel (TSP) that forms the interlayer structure with the touch pad.

The first display module 120 may display information about the abnormal state or the reservation state of the personal mobility device 1.

The first display module 120 may display at least one of map information, route information, current location information, driving speed information, destination information, or traffic information in an image during execution of the navigation function. The first display module 120 may display travel time, time left to a destination, a current time, etc.

The first display module 120 may also display information about a state of charge of a battery of the personal mobility device 1, and information about a movable distance and a movable time with the personal mobility device 1.

The location receiver 130 may obtain current location information of the personal mobility device 1 and transmit the current location information, i.e., the storage location information, to the first controller 150.

The location receiver 130 may include a GPS receiver for the communication module for obtaining GPS location information of the current location of the personal mobility device 1.

The GPS receiver may include an antenna module for receiving signals from a plurality of GPS satellites, software for obtaining a current location by using distance and time information corresponding to location signals from the plurality of GPS satellites, and an output module for outputting the obtained location data of the personal mobility device 1.

The first communication module 140 transmits a signal having information corresponding to a control instruction from the first controller 150 to at least one of the first server or the terminal 4. The terminal 4 may be located within a preset distance to the personal mobility device 1.

The first communication module 140 is also able to receive signals of information transmitted from the first server 2 and the terminal 4 and forward the received signal to the first controller iso.

The first communication module 140 may be a communication module for performing communication in a different communication scheme from that of the location receiver 130, and may include one or more communication modules that enable communication with the first server 2 and the terminal 4, for example, at least one of a short-range communication module, a wired communication module, or a wireless communication module.

The short-range communication module may include various short range communication modules for transmitting and receiving signals within a short range over a wireless communication network, such as a Bluetooth module, an infrared communication module, a radio frequency identification (RFID) communication module, a wireless local access network (WLAN) communication module, a near field communication (NFC) module, a Zigbee communication module, etc.

The wired communication module may include not only one of various wired communication modules, such as a local area network (LAN) module, a wide area network (WAN) module, or a value added network (VAN) module, but also one of various cable communication modules, such as a universal serial bus (USB), a high definition multimedia interface (HDMI), a digital visual interface (DVI), recommended standard (RS) 232, a power cable, or a plain old telephone service (POTS).

The wireless communication module may include a wireless fidelity (Wi-Fi) module, a wireless broadband (Wibro) module, and/or any wireless communication device for supporting various wireless communication schemes, such as a global system for mobile communication (GSM) module, a code division multiple access (CDMA) module, a wideband code division multiple access (WCDMA) module, a universal mobile telecommunications system (UMTS), a time division multiple access (TDMA) module, a long term evolution (LTE) module, etc.

The wireless communication module may include a wireless communication interface with an antenna and transmitter for transmitting signals to the personal mobility device 1. Furthermore, the wireless communication module may further include a signal conversion module for modulating a digital control signal output from the first controller 150 through the wireless communication interface to an analog wireless signal under the control of the first controller 150.

The wireless communication module may also include a wireless communication interface with an antenna and receiver for receiving signals from the personal mobility device 1. Furthermore, the wireless communication module may include a signal conversion module for demodulating an analog radio signal through the wireless communication interface into a digital control signal.

The first controller 150 may control driving, stopping, or steering of the personal mobility device 1 in response to a user input entered to the first input module no. To control the driving, stopping, or steering of the personal mobility device 1, the first controller 150 may control the rotation speed of a motor or a moving direction of wheels.

The first controller 150 may control operation of the lamp module 180, the first display module 120, or the sound output module 160 in response to a user input entered to the first input module no.

The first controller 150 may diagnose a fault of the personal mobility device 1, and control operation of the lamp module 180, the first display module 120, or the sound output module 160 based on the diagnosis information.

The first controller 150 may control communication with the terminal 4 to accept or reject driving.

The first controller 150 may transmit current location information received from the location receiver 130 to the first server 2 when determining that the use of the personal mobility device 1 is completed.

When determining that the use of the personal mobility device 1 is completed, the first controller 150 may determine whether communication information is received through the first communication module 140, and when determining that the communication information has been received through the first communication module 140, the first controller 150 may control the received communication information to be transmitted to the first server 2 along with the current location information received from the location receiver 130.

When the first controller 150 determines that the communication information has been received after the use of the personal mobility device 1 was completed, it may correct the information about the GPS location and may transmit the corrected storage location information to the terminal 4.

The first controller 150 may also obtain location information of an external communication device that performs communication with the first communication module 140 based on a MAC address or an IP address in the communication information, obtain information about a distance to the external communication device based on received signal strength indication (RSSI) of a signal for the communication information, and correct the storage location information of the personal mobility device 1 based on the obtained GPS location information and the location information of the external communication device.

The external communication device may be located within a distance that allows communication with the personal mobility device 1. The distance allowing communication with the personal mobility device 1 may be different depending on the communication specification or communication scheme of the first communication module 140.

When determining that the communication information has not been received, the first controller 150 may control the corrected storage location information to be received and stored from the first server 2 and control the corrected storage location information to be transmitted to the terminal 4.

The first controller 150 may be implemented with a memory (not shown) for storing an algorithm to control operation of the components of the personal mobility device 1 or data about a program that embodies the algorithm, and a processor (not shown) for carrying out the aforementioned operation using the data stored in the memory. The memory and the processor may be implemented in separate chips. Alternatively, the memory and the processor may be implemented in a single chip.

The first storage 151 may store reservation information in response to a control instruction from the first controller 150. In this case, the reservation information may include identity information, start time of usage, and stop time of usage of the reserved personal mobility device 1.

The first storage 151 may store the GPS location information and the identity information of the personal mobility device 1.

The first storage 151 may store identity information of an administrator terminal and communication information received through the first communication module.

The first storage 151 may be implemented with a non-volatile memory device, such as cache, read only memory (ROM), programmable ROM (PROM), erasable programmable ROM (EPROM), electrically erasable programmable ROM (EEPROM), or a volatile memory device, such as random access memory (RAM), without being limited thereto.

The first storage 151 may be a memory implemented with a chip separate from the aforementioned processor in relation to the first controller 150, or may be implemented integrally with the processor in a single chip.

The sound output module 160 may output a sound in response to a control instruction from the first controller 150. The sound output module 160 may include one or more speakers.

The driver 170 is to generate driving power for driving the personal mobility device 1, i.e., the driver 170 may start or stop driving the motor 171 in response to a control instruction from the first controller iso.

The driver 170 may drive the motor 171 at a speed corresponding to a control instruction from the first controller iso.

The lamp module 180 may be provided on at least one of the board 101, the support 103, or the handle 104 of the personal mobility device 1, and may include at least one light source.

The lamp module 180 may help the user easily see around the personal mobility device 1 while watching a forward view. The lamp module 180 may perform not only a lighting function but also a signaling or communication function for other vehicles and pedestrians.

The lamp module 180 may include one or more lamps, which may be turned on or off or may flicker in response to a control instruction from the first controller iso.

The lamp module 180 may be arranged on the front or back of the board 101 of the personal mobility device 1, and may include lamps for illuminating a long range, a short range, and the back, and lamps for indicating brake, turn, or emergency.

The lamp module 180 may include lamps for recognition that are turned on or off or flicker according to a storage state, an abnormal state, or a reserved state of the personal mobility device 1.

At least one component may be added or omitted to correspond to the performance of the components of the personal mobility device 1 shown in FIG. 2. Furthermore, it will be obvious to those of ordinary skill in the art that the relative positions of the components may be changed to correspond to the system performance or structure.

The components of the personal mobility device 1 shown in FIG. 2 may refer to software, or hardware components such as Field Programmable Gate Arrays (FPGAs) and Application Specific Integrated Circuits (ASICs).

Figure 3:
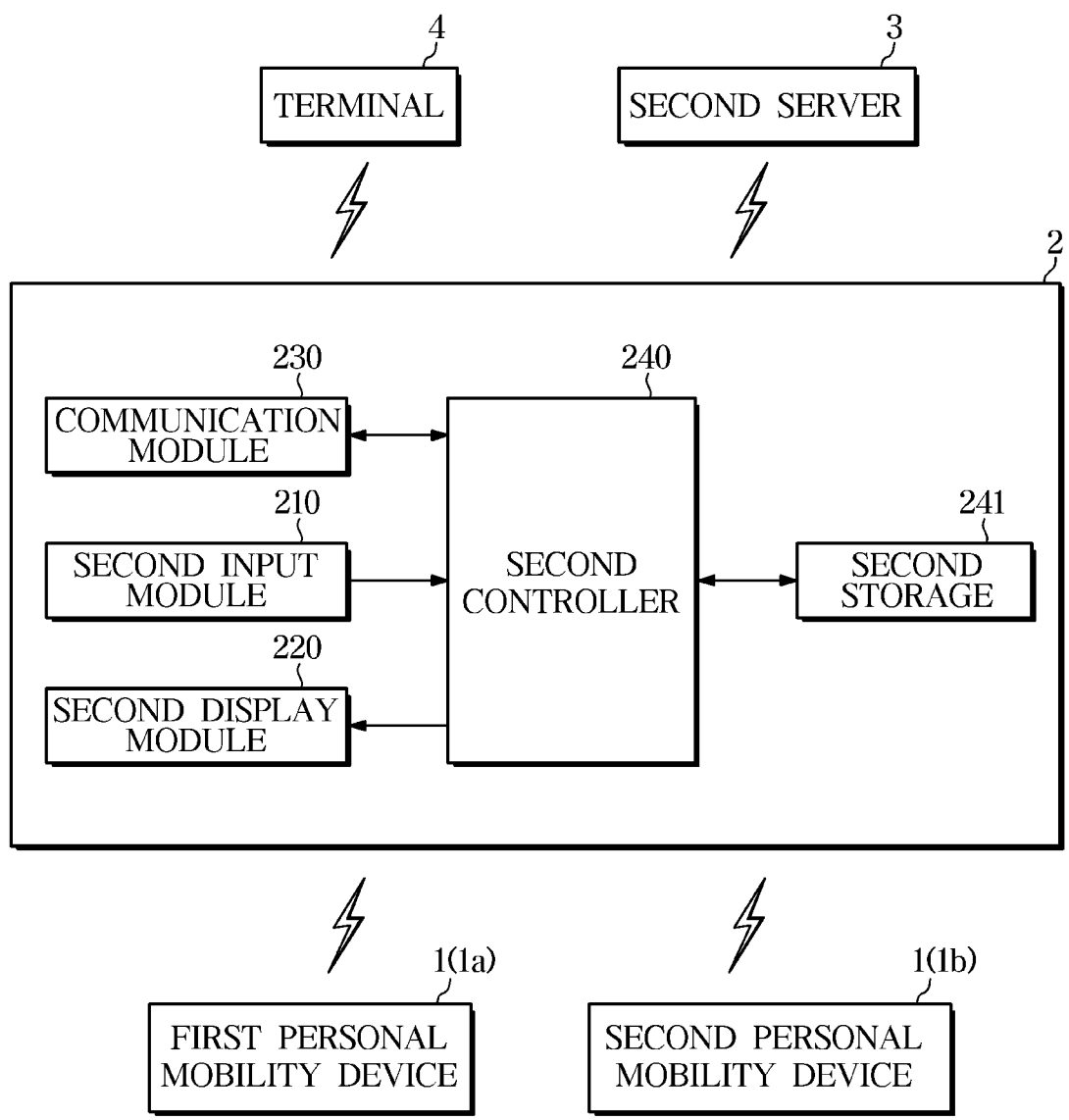
FIG. 3 is a control block diagram of a first server, according to an embodiment of the disclosure.
Figure 4:
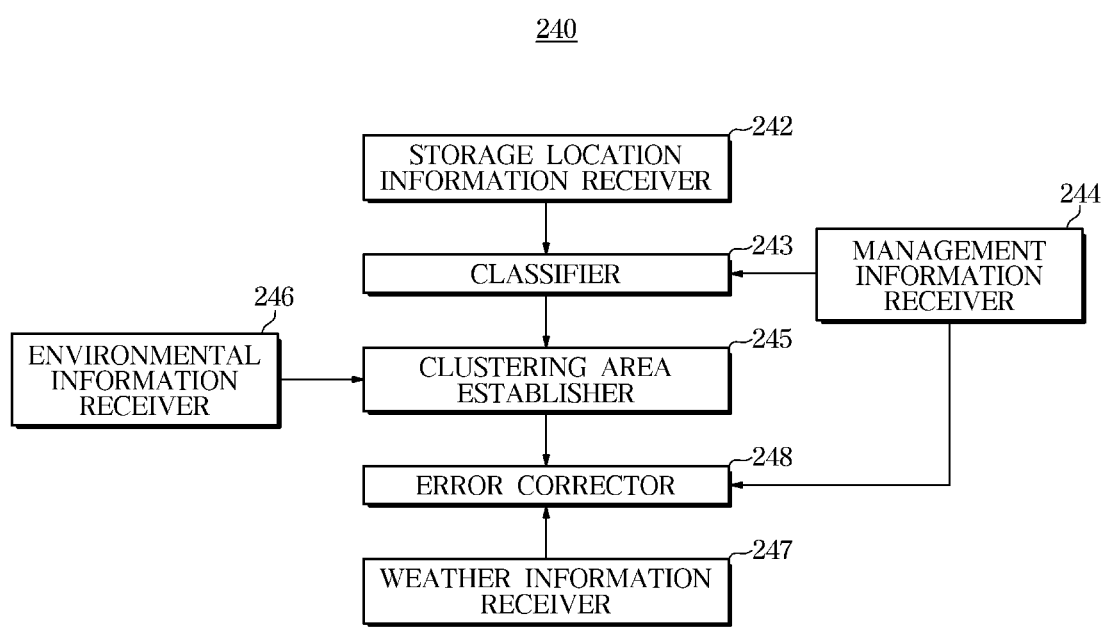
FIG. 4 is a detailed block diagram of a second controller equipped in a first server, according to an embodiment of the disclosure.

FIG. 3 is a control block diagram of a first server, according to an embodiment of the disclosure, and FIG. 4 is a detailed block diagram of a second controller equipped in the first server, according to an embodiment of the disclosure.

The first server 2 may include a second input module 210, a second display module 220, a second communication module 230, a second controller 240, and a second storage 241.

To distinguish components with the same name between the personal mobility device 1 and the first server 2, the word 'second' is added in front of the component of the first server 2.

The second input module 210 may receive identity information of a personal mobility device to be managed and identity information of an administration terminal (not shown).

The second display module 220 may display information in an image in response to a control instruction from the second controller 240.

The second display module 220 may display identity information of the personal mobility device, storage location information of the personal mobility device matching the identity information of the personal mobility device, usage history information of the personal mobility device, information about whether to drive the personal mobility device, etc.

The second display module 220 may also display fault information and storage location information of the personal mobility device matching the identity information of the personal mobility device.

The second display module 220 may also display identity information and storage location information of a first mobility device used to correct storage location information of a second personal mobility device.

The second display module 220 may also display a clustering area established by the first personal mobility device along with map information.

The second communication module 230 may perform communication with the first and second personal mobility devices 1, i.e., 1a and 1b, respectively, and communicate with the terminal 4.

The second communication module 230 may perform communication with the second server 3 as well as an administration terminal (not shown).

When the first server 2 is different from a server for a sharing service company, the second communication module 230 is able to communicate with the server for the sharing service company.

The second communication module 230 may include at least one of wired or wireless communication. The second communication module 230 may perform communication in the same manner as in the first communication module 140.

The second controller 240 may determine whether storage location information includes communication information when the storage location information is received from the personal mobility device 1, recognize the personal mobility device as the first personal mobility device 1a whose storage location information is accurate when determining that the received storage location information includes the communication information, and recognize the personal mobility device as the second personal mobility device 1b whose storage location information is not accurate when determining that no communication information but only the GPS location information is included in the received storage location information.

In other words, the second controller 240 may receive GPS location information and communication information from the first personal mobility device 1a, and receive only GPS location information from the second personal mobility device 1b.

When receiving the GPS location information from the first or second personal mobility device, the second controller 240 may receive identity information of the personal mobility device as well.

The second controller 240 may obtain storage location information of the first personal mobility device 1a based on the GPS location information and the communication information of the first personal mobility device 1a, and obtain accurate storage location information of the second personal mobility device 1b by correcting the GPS location information of the second personal mobility device 1b based on the storage location information of the first personal mobility device 1a.

The second controller 240 may establish a clustering area based on storage location information of a plurality of first personal mobility devices 1a, and correct the GPS location information of the second personal mobility device 1b located in the established clustering area.

The second controller 240 may obtain location error information based on the GPS location information and the communication information of the first personal mobility device 1a, and correct the GPS location information of the second personal mobility device 1b located in the clustering area based on the obtained location error information.

The second controller 240 may adjust the obtained location error information based on weather information, and correct the GPS location information of the second personal mobility device 1b based on the adjusted location error information.

The second controller 240 may be implemented with a memory (not shown) for storing an algorithm to control operation of the components of the personal mobility device 1 or data about a program that embodies the algorithm, and a processor (not shown) for carrying out the aforementioned operation using the data stored in the memory. The memory and the processor may be implemented in separate chips. Alternatively, the memory and the processor may be implemented in a single chip.

The second storage 241 may store user information, identity information of a plurality of personal mobility devices, and identity information of the administration terminal.

The second storage 241 may store a corrected value corresponding to the weather information.

For example, the second storage 241 may store corrected values corresponding to a range (small, medium and large) of rainfall, and corrected values corresponding to cloudy levels or a range (small, medium and large) of wind volume.

The second storage 241 may store location error information of a plurality of first personal mobile devices 1a.

The second storage 241 stores information about a radius to establish a clustering area based on a location error or a location error corrected by the weather information.

The second storage 241 may store a maximum radius to establish a clustering area, and information about a reference distance to obtain a location error.

The second storage 241 may be implemented with a non-volatile memory device, such as cache, ROM, PROM, EPROM, EEPROM, or a volatile memory device, such as RAM without being limited thereto.

The second storage 241 may be a memory implemented with a chip separate from the aforementioned processor in relation to the second controller 240, or may be implemented integrally with the processor in a single chip.

A configuration of the second controller 240 will now be described in connection with FIG. 4.

The second storage 241 may include a storage location information receiver 242, a classifier 243, a management information receiver 244, a clustering area establisher 245, an environmental information receiver 246, a weather information receiver 247, and an error corrector 248.

The storage location information receiver 242 may receive storage location information from a plurality of personal mobility devices.

The storage location information received from the plurality of personal mobility devices may include identity information and GPS location information of the personal mobility device and further include communication information.

The storage location information receiver 242 may also receive the storage location information from the management information receiver 244.

The classifier 243 may classify a personal mobility device as the first personal mobility device 1a when identity information and storage location information of the personal mobility device are received by the storage location information receiver 242, and match and store the identity information and the storage location information of the first personal mobility device as information of the first personal mobility device 1a.

The classifier 243 may determine whether storage location information includes communication information in addition to the GPS location information when the storage location information is received from the personal mobility device, and classify the personal mobility device as the first personal mobility device is whose storage location information is accurate when determining that the received storage location information includes the communication information.

The classifier 243 classifies the personal mobility device as the second personal mobility device 1b whose storage location information is not accurate when determining that the storage location information received from the personal mobility device includes no communication information but only the GPS location information.

The classifier 243 may classify the personal mobility device that has transmitted the storage location information as the first personal mobility (KPM) device is or the second personal mobility (UPM) device 1b, and match and store the identity information and the storage location information of the first personal mobility device is as information of the first personal mobility device 1a and match and store the identity information and the storage location information of the second personal mobility device 1b as information of the second personal mobility device 1b.

The storage location information of the first personal mobility device is includes GPS location information and further includes communication information about a MAC address, an IP address, and received signal strength.

The storage location information of the second personal mobility device 1b includes GPS location information.

The management information receiver 244 may receive identity information and storage location information of a personal mobility device corresponding to management information of the personal mobility device from the administration terminal (not shown).

When a server for a sharing service company is separately provided, the management information receiver 244 may receive management information from the server for the sharing service company.

The management information received by the server for the sharing service company and the management terminal (not shown) may be storage location information with an accuracy equal to or greater than a reference accuracy and may be received along with identification information of the personal mobility device.

The management information receiver 244 may send the identity information and the storage location information of the personal mobility device to the classifier 243 and the error corrector 248.

The clustering area establisher 245 may establish a clustering area based on storage location information of at least one first personal mobility device 1a.

The clustering area establisher 245 may set a radius to establish a clustering area based on the storage location information of the at least one first personal mobility device 1a, location error information, and weather information.

Figure 5:
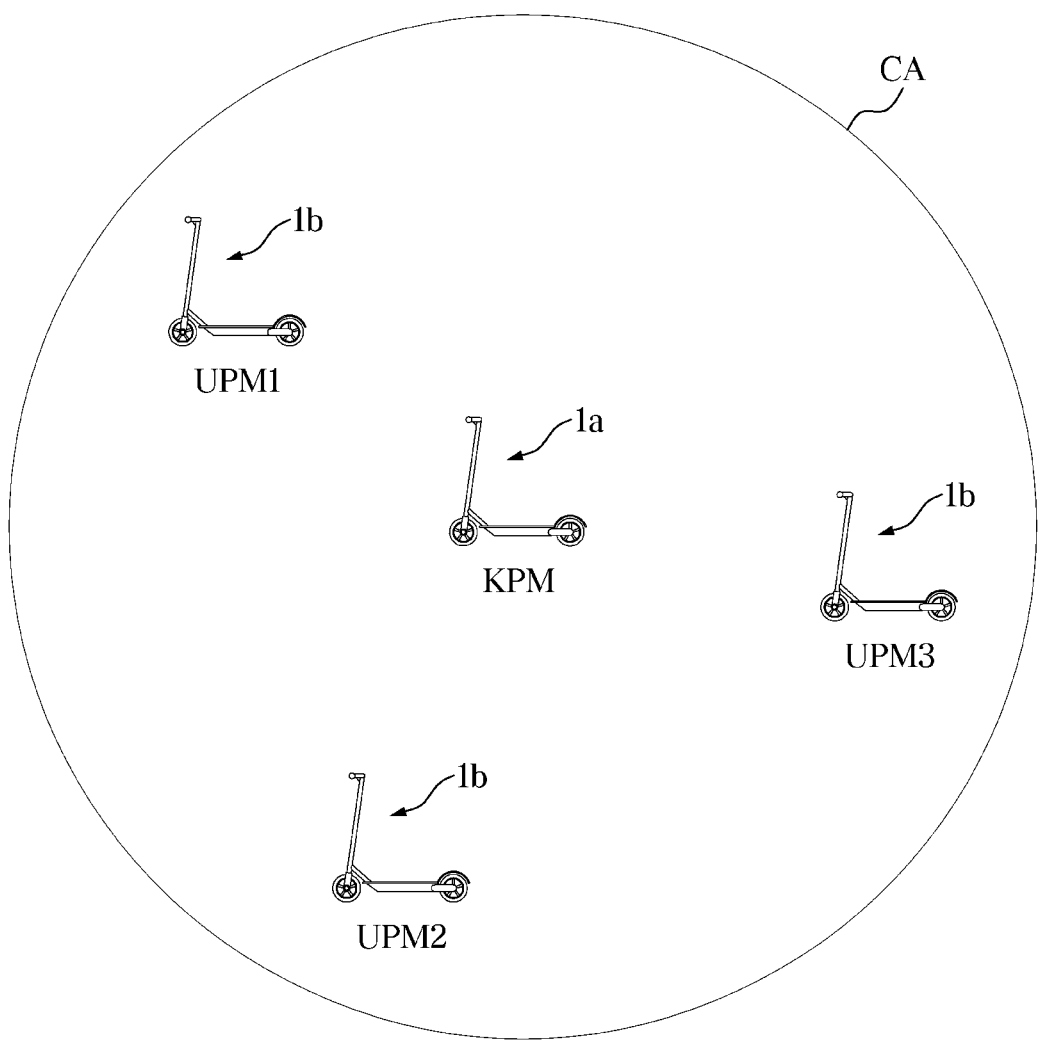
FIGS. 5 to 9 illustrate how a first server establishes a clustering area, according to an embodiment of the disclosure.

As shown in FIG. 5, the clustering area establisher 245 may set up a clustering area CA based on storage location information of at least one first personal mobility device (KPM) 1a.

The clustering area establisher 245 may determine a radius of the clustering area CA based on the number of the first personal mobility devices 1a and information about a distance between the plurality of the first personal mobility devices 1a, and establish the clustering area CA based on the determined radius. This will be described in connection with FIGS. 6 to 9.

When there is one of the first personal mobility devices 1a within a certain radius, the clustering area establisher 245 may establish a clustering area with a preset radius MR from a storage location of the first personal mobility device 1a based on the storage location information of the first personal mobility device and the preset radius.

Figure 6:
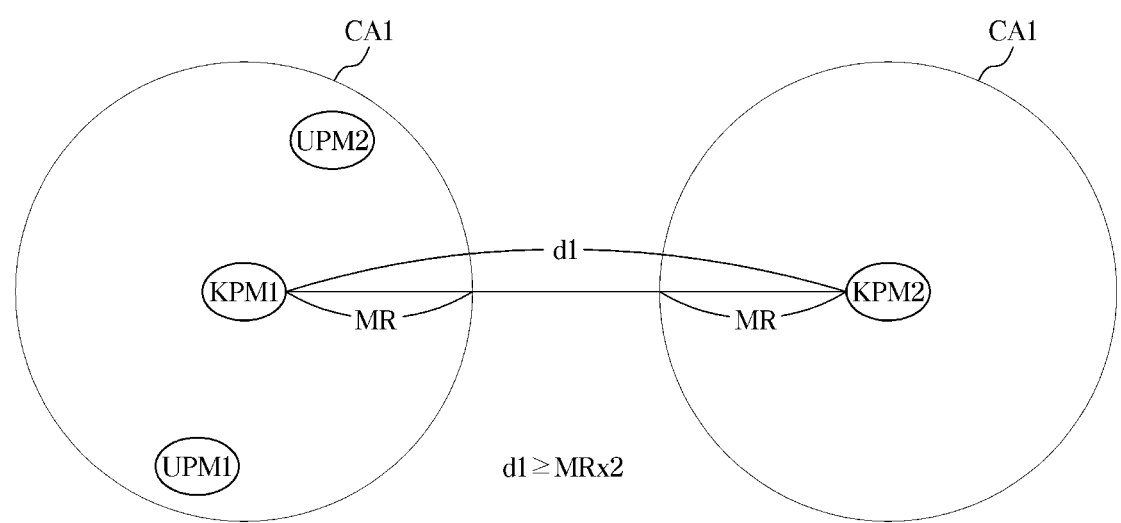

As shown in FIG. 6, when there are two first personal mobility devices KPM1 and KPM2, the clustering area establisher 245 may obtain information about a distance d1 between the two first personal mobility devices KPM1 and KPM2 based on the storage location information of the two first personal mobility devices KPM1 and KPM2, and when the distance d1 between the two first personal mobility devices KPM1 and KPM2 is longer than a distance equal to double the preset radius MR*2, i.e., d1>=MR*2, a clustering area CA1 having the preset radius from the storage location of each of the first personal mobility devices may be established.

Figure 7:
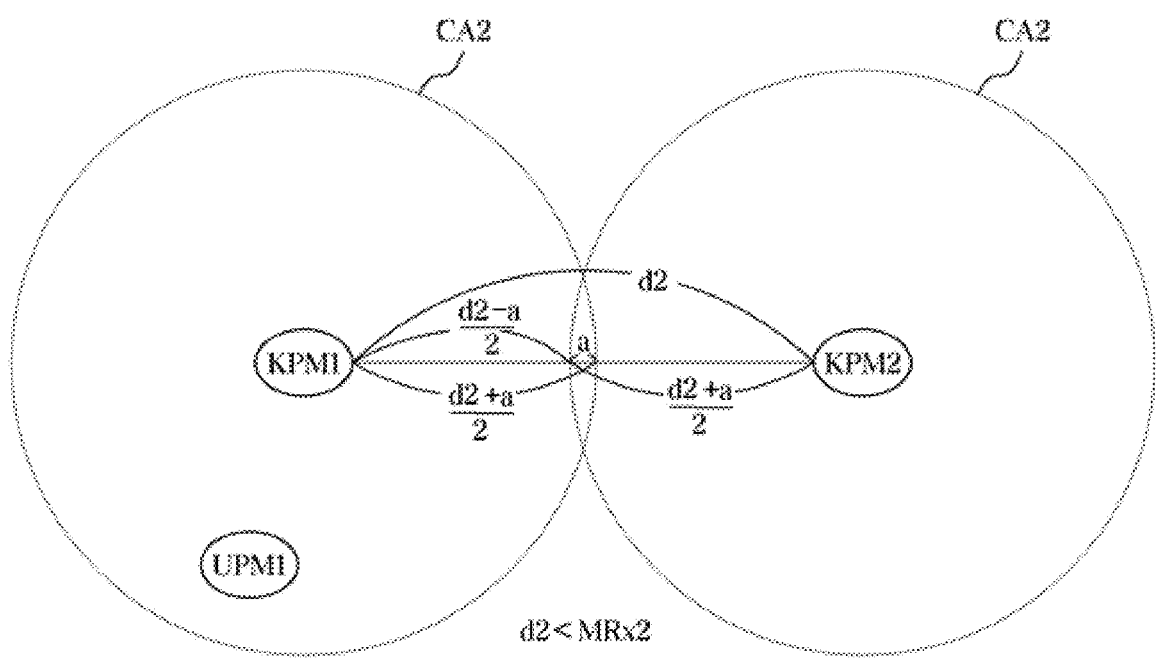

As shown in FIG. 7, when there are two first personal mobility devices KPM1 and KPM2, and a distance d2 between the two first personal mobility devices KPM1 and KPM2 based on distance information obtained is shorter than a distance equal to double the preset radius MR*2, i.e., d2<MR*2, the clustering area establisher 245 may obtain a radius (d2+a)/2 based on the storage location information of each of the first personal mobility devices, the obtained distance information and certain distance information, and establish a clustering area CA2 having the obtained radius from the storage location of each of the first personal mobility devices.

Figure 8:
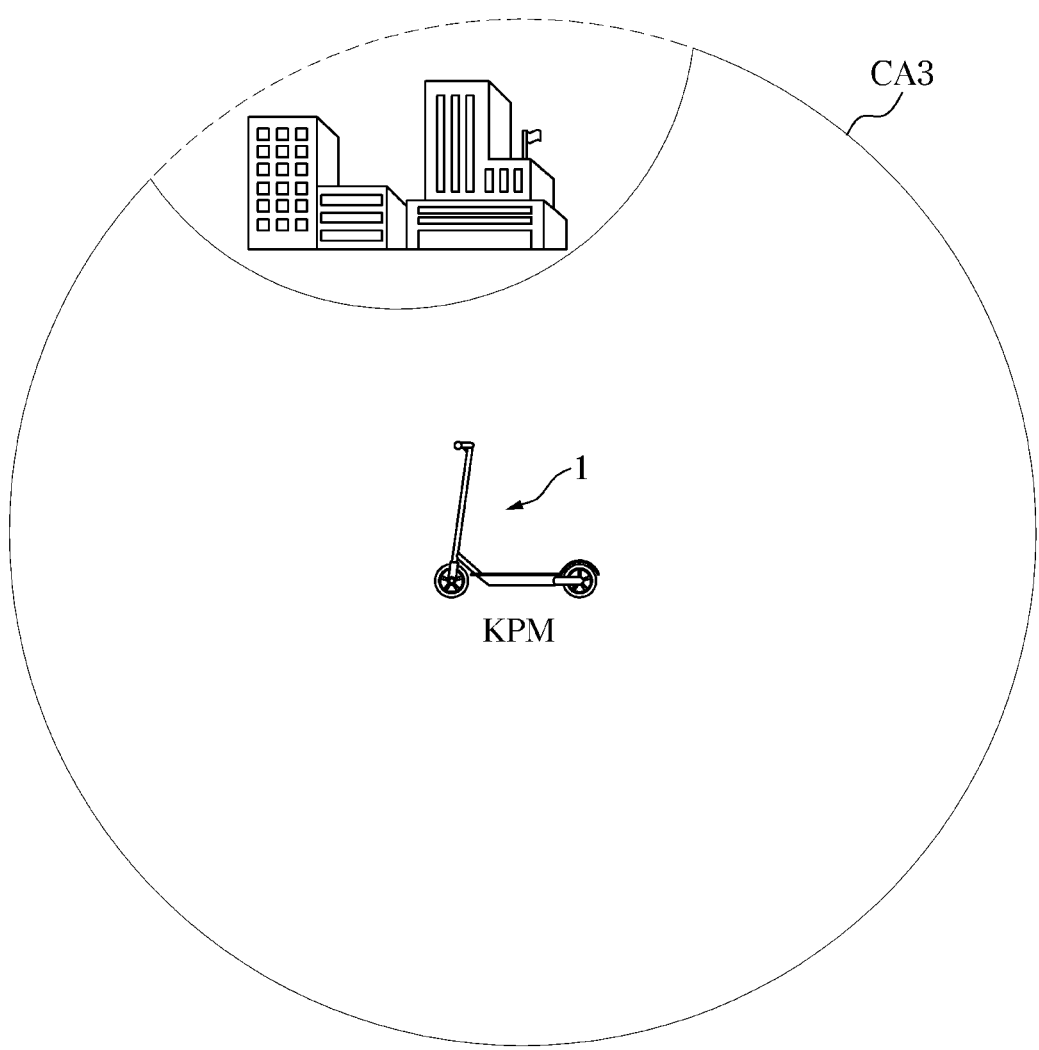

As shown in FIG. 8, when there is an obstacle present in an established clustering area, the clustering area establisher 245 may exclude an area where the obstacle is present from the clustering area. The clustering area establisher 245 may establish a clustering area CA3 excluding the area where the obstacle is present.

The obstacle may include a building larger than a reference size or more than the reference number of buildings.

Figure 9:
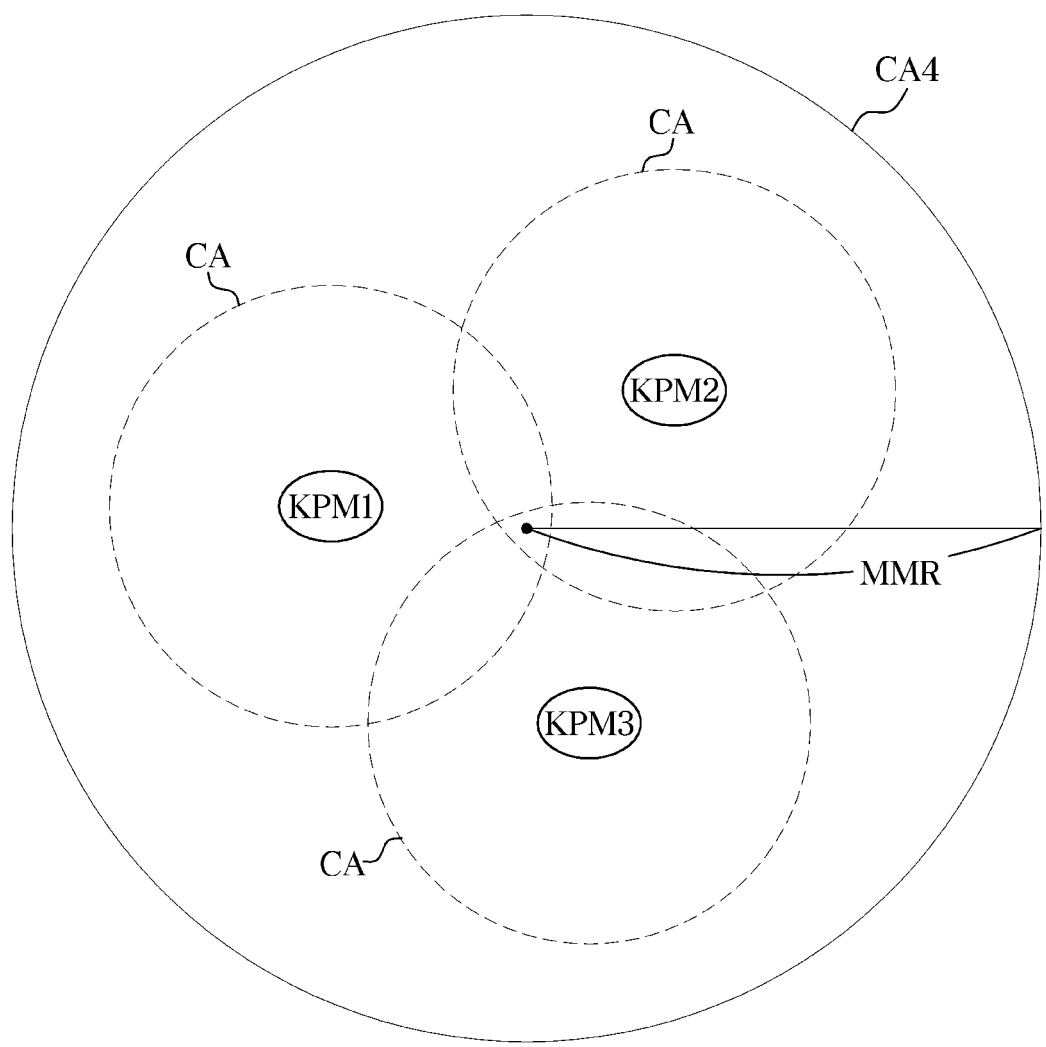

As shown in FIG. 9, when a plurality of clustering areas overlap each other, the clustering area establisher 245 may establish a clustering area CA4 based on a preset maximum radius.

The environmental information receiver 246 may communicate with a map provider server (not shown) and receive environmental information about a surrounding condition of the storage location of the personal mobility device from the map provider server. For example, the environmental information may include a height of a building, a width of the building, the number of buildings, a height of a roadside tree, the number of roadside trees, etc., and further include location information of an open space with more than a preset size.

The environmental information receiver 246 may send location information, identity information, and communication scheme information of external communication devices to the clustering area establisher 245.

The weather information receiver 247 may receive weather information from the second server 3 and send the weather information to the error corrector 248.

The error corrector 248 may identify at least one of a MAC address and an IP address in the communication information received from the first personal mobility device 1a, and determine location information of an external communication device based on at least one of the MAC address and the IP address.

The error corrector 248 may obtain distance information corresponding to received signal strength in the communication information received by the first personal mobility device 1a. The obtained distance information may correspond to a distance between the first personal mobility device 1a and the external communication device.

The error corrector 248 may obtain location error information for GPS location information of the first personal mobility device 1a based on the location information of the external communication device and the distance information.

The error corrector 248 may recognize the second personal mobility device 1b located in the established clustering area based on GPS location information of the second personal mobility device 1b, and correct the GPS location information of the second personal mobility device 1b based on the location error information of the first personal mobility device 1a.

As shown in FIG. 5, the error corrector 248 may recognize the second personal mobility devices 1b, i.e., UPM1, UPM2, and UPM3 located in the clustering area CA and correct GPS location information of the second personal mobility devices 1b: UPM1, UPM2, and UPM3.

The error corrector 248 may identify a corrected value corresponding to weather information, correct location error information for the GPS location information based on the identified corrected value, and correct the GPS location information of the second personal mobility device 1b based on the corrected location error information. Accordingly, accurate storage location information of the second personal mobility device 1b may be obtained.

The error corrector 248 may transmit the corrected storage location information of the second personal mobility device 1b to at least one of the second personal mobility device 1b, a terminal, a server for a sharing service company, or an administration terminal.

When the accurate storage location information of the second personal mobility device 1b is obtained, the error corrector 248 may change the second personal mobility device 1b to the first personal mobility device 1a.

Figure 10:
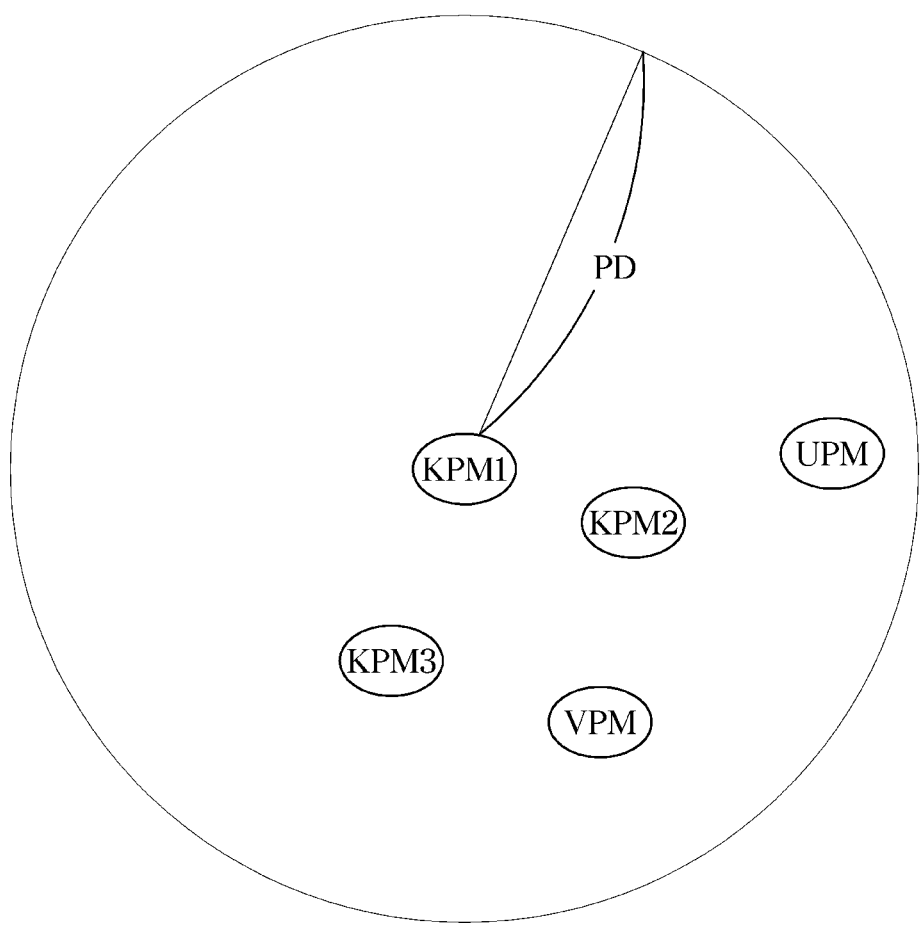
FIGS. 10 and 11 illustrate how a first server obtains average location error information, according to an embodiment of the disclosure.

As shown in FIG. 10, the error corrector 248 may create a virtual personal mobility (VPM) device when determining that there are a plurality of first personal mobility devices KPM2 and KPM3 within a reference distance PD based on the storage location information of any of the first personal mobility devices, i.e., KPM1, obtain average location error information based on location error information of the first personal mobility device KPM1 and location error information of a plurality of first personal mobility devices KPM2 and KPM3, and set the obtained average location error information to location error information of the virtual personal mobility (VPM) device.

The error corrector 248 may correct the GPS location information of a surrounding second personal mobility device based on the location error information of the VPM device.

The second personal mobility device may be a personal mobility device located in a clustering area established based on the storage location information of the first personal mobility device KPM1.

The error corrector 248 may create the VPM device based on the storage location information of the first personal mobility device KPM1 and the storage location information of the plurality of first personal mobility devices KPM2 and KPM3, and obtain the storage location information of the VPM device based on the storage location information of the first personal mobility device KPM1 and the storage location information of the plurality of first personal mobility devices KPM2 and KPM3.

The error corrector 248 may obtain a sum of location errors based on the location error information of the first personal mobility device KPM1 and location error information of the plurality of first personal mobility devices KPM2 and KPM3, and obtain an average location error based on the number of the first personal mobility devices and the sum of location errors.

The reference distance PD may be a distance corresponding to a maximum location error from the GPS location. For example, the reference distance may be about 5 meters.

Figure 11:
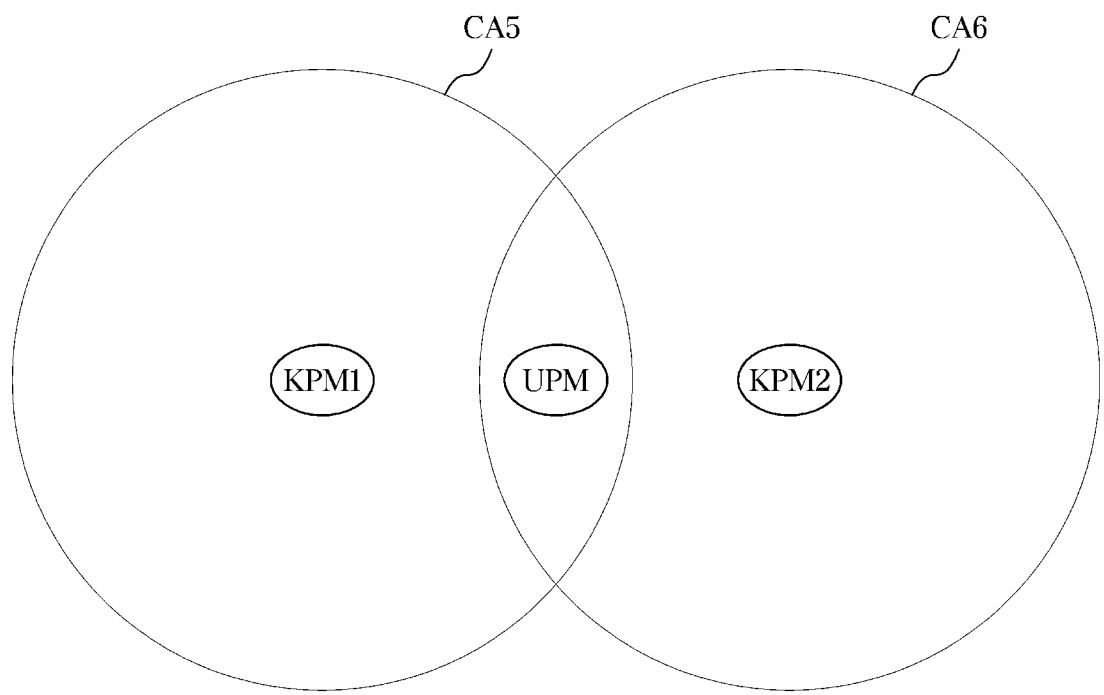

As shown in FIG. 11, when determining that the second personal mobility device is located in two clustering areas, the error corrector 248 may obtain average location error information based on location error information of the first personal mobility device KPM1 in the first clustering area CM and location error information of the first personal mobility device KPM2 in the second clustering area CA6, and correct the location error information of the second personal mobility device (UPM) based on the obtained average location error information.

At least one component may be added or omitted to correspond to the performance of the components of the personal mobility device shown in FIG. 11. Furthermore, it will be obvious to those of ordinary skill in the art that the relative positions of the components may be changed to correspond to the system performance or structure.

The components of the personal mobility device shown in FIG. 11 may refer to software, or hardware components such as FPGAs and ASICs.

Figure 12:
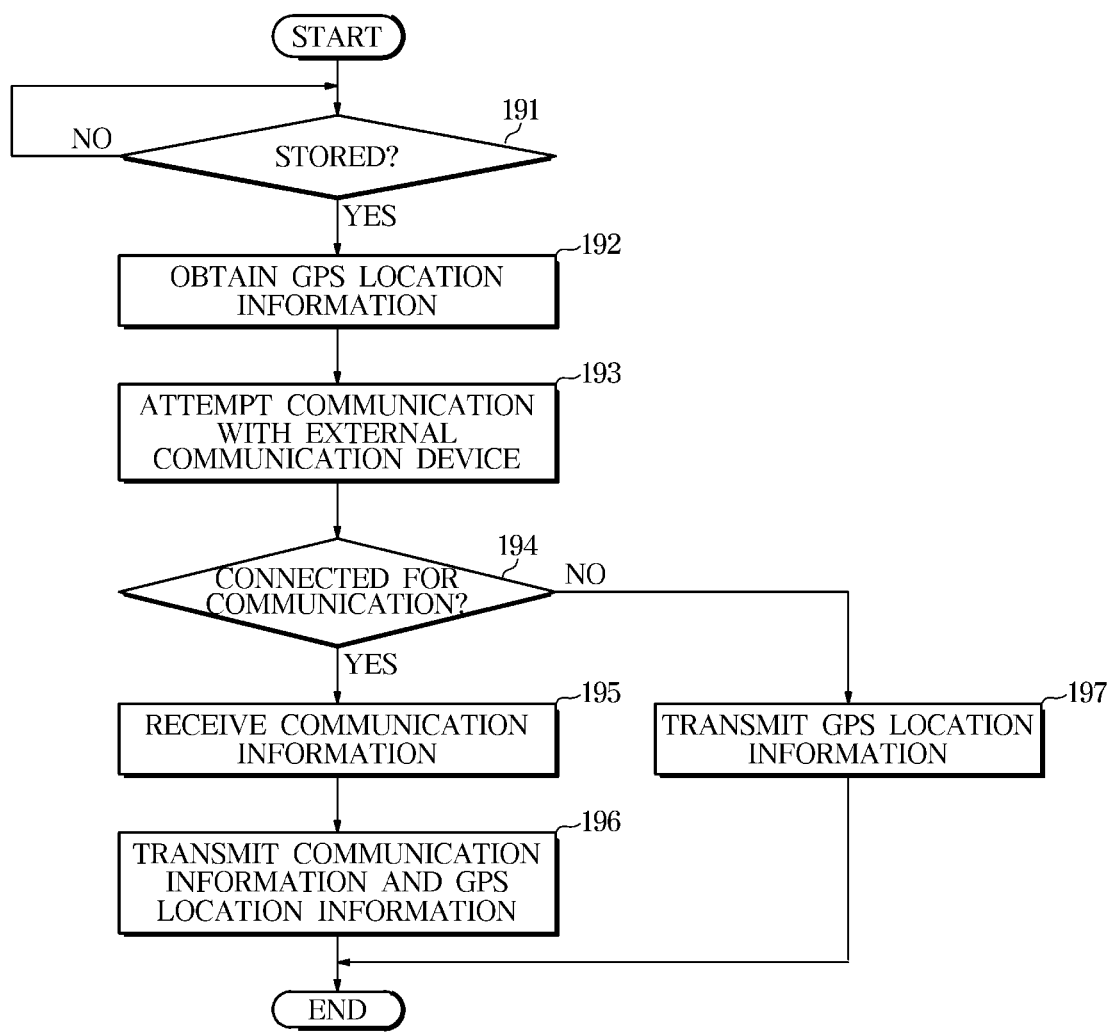
FIG. 12 is a flowchart of controlling a personal mobility device, according to an embodiment of the disclosure.

FIG. 12 is a flowchart of controlling a personal mobility device, according to an embodiment of the disclosure.

First, a personal mobility device determines whether it is stored, in 191, and when determining that the personal mobility device is in storage, obtains GPS location information based on a GPS signal received by the location receiver 130, in 192, wherein the GPS location information is initial location information.

The personal mobility device attempts communication with an external communication device through a different communication module, in 193.

When the personal mobility device is connected to the external communication device for communication in 194, it may receive communication information from the external communication device in 195. The personal mobility device may obtain received signal strength when receiving the communication information. In this case, the personal mobility device transmits the GPS location information and the communication information that includes the received signal strength to the first server 2, in 196.

On the other hand, when the personal mobility device is not connected to the external communication device for communication in 194, it may not receive the communication information from the external communication device. In this case, the personal mobility device may transmit only the GPS location information to the first server 2, in 197.

Figure 13:
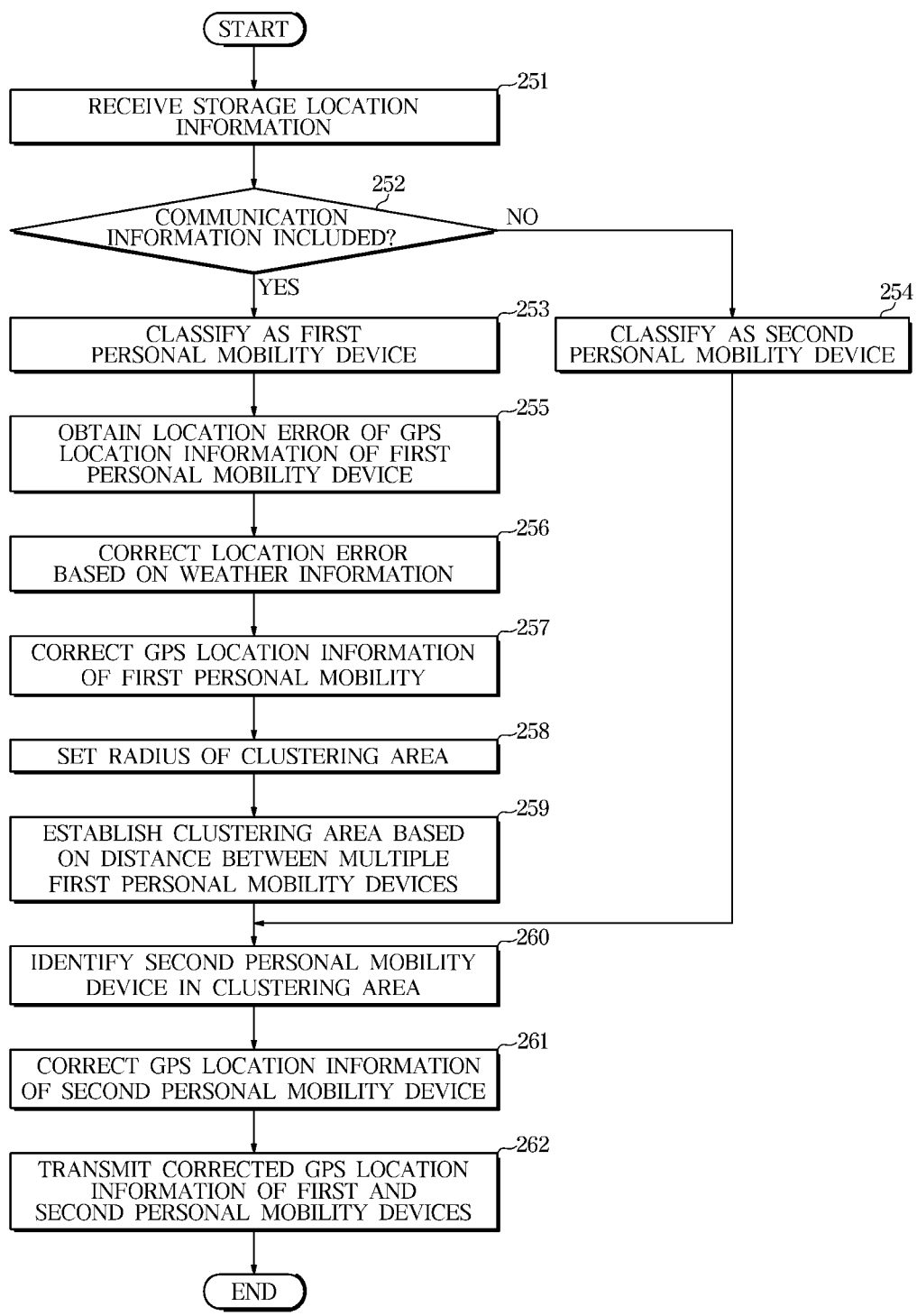
FIG. 13 is a flowchart of controlling a first server, according to an embodiment of the disclosure.

FIG. 13 is a flowchart of controlling a first server, according to an embodiment of the disclosure.

When identity information and storage location information of the personal mobility device is received from the personal mobility device in 251, the first server 2 determines whether the storage location information includes communication information in addition to GPS location information in 252, and classifies the personal mobility device as the first personal mobility device 1*a* in 253 when determining that the received storage location information includes the communication information.

The first server 2 classifies the personal mobility device as the second personal mobility device 1*b* in 254, when determining that the storage location information includes no communication information but only the GPS location information in 252.

The first server 2 may classify a personal mobility device as the second personal mobility device when identity information and storage location information of the personal mobility device are received from an administration terminal or a server for a sharing service company.

Specifically, the first server 2 may classify the personal mobility device that has transmitted the storage location information as the first personal mobility (KPM) device 1*a* or the second personal mobility (UPM) device 1*b*, and match and store the identity information and the storage location information of the first personal mobility device as information of the first personal mobility device and match and store the identity information and the storage location information of the second personal mobility device as information of the second personal mobility device.

The storage location information of the first personal mobility device 1*a* includes GPS location information and further includes communication information about a MAC address, an IP address, and received signal strength.

The storage location information of the second personal mobility device 1*b* includes GPS location information.

The storage location information received by the server for a sharing service company and the administration terminal (not shown) may have a location error between an actual storage location of the personal mobility device and a storage location based on the GPS location information that is less than a reference location error.

The location error between an actual storage location of the personal mobility device and a storage location based on the GPS location information being less than the reference location error means that the storage location information has an accuracy of the GPS location information equal to or higher than a reference accuracy.

The first server 2 identifies identity information and storage location information of personal mobility devices classified as the first personal mobility device, and corrects the GPS location information of each of the first personal mobility devices based on the identified storage location information.

Specifically, the first server 2 may identify at least one of a MAC address and an IP address of the communication information received by the first personal mobility device, may identify identity information of an external communication device based on the at least one of the MAC address and the IP address, and may determine location information of the external communication device having the identified identity information.

The first server 2 may obtain distance information corresponding to a received signal strength in the communication information received by the first personal mobility device. The obtained distance information may correspond to a distance between the first personal mobility device 1*a* and the external communication device.

The first server 2 may obtain actual storage location information of the first personal mobility device based on the location information of the external communication device and the distance information.

The first server 2 obtains a location error between the actual storage location of the first personal mobility device and the storage location based on the GPS location information in 255, and corrects the GPS location information of the first personal mobility device based on the obtained location error in 256. Accordingly, highly accurate storage location information of the first personal mobility device may be obtained.

The first server further checks weather information and corrects the location error based on the weather information.

The first server may obtain storage location information of the first personal mobility device by correcting the GPS location information of the first personal mobility device based on the corrected location error in 257.

The first server sets a radius in advance to establish a clustering area based on the location error or a location error corrected according to the weather information, in 258.

The first server establishes a clustering area based on the preset radius and a distance between a plurality of first personal devices, in 259. An example of this will now be described.

The first server may create a VPM device when determining that there is at least one different first personal mobility device KPM2 and KPM3 within a reference distance PD based on storage location information of any of the first personal mobility devices, i.e., KPM1 (also referred to as a representative first personal mobility device), may obtain average location error information based on location error information of the representative first personal mobility device KPM1 and location error information of the at least one different first personal mobility device KPM2 and KPM3, and may set the obtained average location error information to location error information of the VPM device.

Specifically, the first server may obtain a sum of location errors based on the location error information of the representative first personal mobility device KPM1 and location error information of the at least one other first personal mobility device KPM2 and KPM3, and may obtain an average location error based on the number of the first personal mobility devices and the sum of location errors.

The first server may correct the GPS location information of a surrounding second personal mobility device based on the location error information of the VPM device.

The second personal mobility device may be a personal mobility device located in a clustering area established based on the storage location information of the first personal mobility device KPM1.

When it is determined based on the storage location information of the representative first personal mobility device KPM1 that there is no other first personal mobility device KPM2 or KPM3 within the reference distance PD, the first server determines based on the storage location information of a plurality of other first personal mobility devices whether there is another first personal mobility device out of the reference distance PD from the storage location of the representative first personal mobility device.

When it is determined that there is the other first personal mobility device out of the reference distance PD from the storage location of the representative first personal mobility device, the first server obtains information about a distance d1 between two first personal mobility devices KPM1 and KPM2 based on the storage location information of the representative first personal mobility device KPM1 and storage location information of the other first personal mobility device KPM2, and determines whether the distance d1 between the two first personal mobility devices KPM1 and KPM2 is equal to or longer than a distance equal to double the preset radius MR*2, i.e., d1>=MR*2.

When the first server determines that the distance d1 between the two first personal mobility devices KPM1 and KPM2 is equal to or longer than the distance equal to double the preset radius MR*2, i.e., d1>=MR*2, the first server may establish a clustering area CA1 having the preset radius from the storage location of each of the first personal mobility devices.

When the first server determines that a distance d2 between the two first personal mobility devices KPM1 and KPM2 based on distance information obtained is shorter than a distance equal to double the preset radius MR*2, i.e., d2<MR*2, the first server may obtain a radius (d2+a)/2 based on the storage location information of each of the first personal mobility devices, the obtained distance information and certain distance information, and establish a clustering area CA2 having the obtained radius from the storage location of each of the first personal mobility devices KPM1 and KPM2.

When it is determined that there is an obstacle in the established clustering area, the first server may exclude an area where the obstacle is present from the clustering area. A clustering area CA3 excluding the area where the obstacle is present may be established.

The obstacle may include a building larger than a reference size or more than a reference number of buildings.

The first server may identify the second personal mobility device present in the clustering area established by the representative first personal mobility device KPM1 in 260, and may correct the GPS location information of the identified second personal mobility device based on corrected location error information of the representative first personal mobility device in 261.

The first server may identify the second personal mobility device present in the clustering area established by the other first personal mobility device KPM2, and correct the GPS location information of the identified second personal mobility device based on corrected location error information of the other first personal mobility device.

As shown in FIG. 11, when determining that the second personal mobility device is located in two clustering areas, the first server may obtain average location error information based on location error information of the first personal mobility device KPM1 in the first clustering area CM and location error information of the first personal mobility device KPM2 in the second clustering area CA6, and correct the location error information of the second personal mobility device (UPM) based on the obtained average location error information.

The first server may transmit the corrected storage location information of the second personal mobility device to at least one of the second personal mobility device, a terminal, a server for a sharing service company, or an administration terminal, and transmit the corrected storage location information of the first personal mobility device to at least one of the first personal mobility device, a terminal, a server for a sharing service company, or an administration terminal in 262.

Meanwhile, the embodiments of the disclosure may be implemented in the form of a recording medium for storing instructions to be carried out by a computer. The instructions may be stored in the form of program codes, and when executed by a processor, may generate program modules to perform operations in the embodiments of the disclosure. The recording media may correspond to computer-readable recording media.

The computer-readable recording medium includes any type of recording medium having data stored thereon that may be thereafter read by a computer. For example, it may be a ROM, a RAM, a magnetic tape, a magnetic disk, a flash memory, an optical data storage device, etc.

The embodiments of the disclosure have thus far been described with reference to the accompanying drawings. It will be obvious to people of ordinary skill in the art that the present disclosure may be practiced in other forms than the embodiments as described above without changing the technical idea or essential features of the present disclosure. The above embodiments are only by way of example, and should not be interpreted in a limited sense.

According to embodiments of the disclosure, an accuracy in storage location of a personal mobility device may be improved by obtaining storage location information about the storage location of the personal mobility device based on wireless communication such as Wi-Fi and a GPS.

According to embodiments of the disclosure, an accuracy in storage location of a personal mobility device may be improved by correcting storage location information about a storage location of the personal mobility device based on weather information.

According to embodiments of the disclosure, an accuracy in storage location information of a personal mobility device, which is less than a reference accuracy, may be improved by correcting the storage location information of the personal mobility device based on storage location information of a personal mobility device whose accuracy is equal to or greater than the reference accuracy.

According to embodiments of the disclosure, an accurate storage location of a personal mobility device may be provided for a user or a manager, so that the user or the manager may easily recognize the personal mobility device. According to the disclosure, the user or the manager may afford time by reducing a time required by the user or the manager to find a personal mobility device.

According to embodiments of the disclosure, efficiency in operation of sharing a personal mobility device may increase.

According to embodiments of the disclosure, quality and commercial values of personal mobility devices may be improved, user satisfaction levels may increase, and product competitiveness may be secured.

Several embodiments of the disclosure have been described above, but a person of ordinary skill in the art will understand and appreciate that various modifications can be made without departing from the scope of the disclosure.

Thus, it will be apparent to those of ordinary skill in the art that the true scope of technical protection is only defined by the following claims.

What is claimed is:

1. A personal mobility device comprising:
a location receiver configured to receive signals from a plurality of satellites to recognize location information;
a communication module configured to perform communication in a different communication method than the location receiver and to communicate with an external communication device and a server; and
a controller configured to:
obtain initial location information based on the signals received by the location receiver and control the initial location information to be transmitted to the server;
in response to receipt of communication information received by a communication module, cause the communication information to be transmitted to the server;
in response to receipt of corrected storage location information received from the server, cause the received corrected storage location information to be stored; and
in response to transmitting the initial location information and not transmitting the communication information, correct the initial location information based on location error information of at least two other personal mobility devices received from the server when the personal mobility device exists within a clustering area set by information about a distance between the at least two other personal mobility devices.

2. The personal mobility device of claim 1, wherein the communication information comprises at least one of medium access control (MAC) address information or Internet protocol (IP) address information and further comprises information about received signal strength.

3. The personal mobility device of claim 1, further comprising an input module configured to receive a user input, wherein the controller is configured to:
attempt connection for communication with the external communication device in response to receipt of a completion command through the input module;
transmit the communication information and the initial location information to the server in response to the connection for communication with the external communication device being made; and
transmit the initial location information to the server in response to the connection for communication with the external communication device not being made.

4. The personal mobility device of claim 1, wherein the communication module comprises a Bluetooth module, a Zigbee module, or a wireless fidelity (Wi-Fi) module.

5. A server comprising:
a communication module; and
a controller configured to:
recognize a personal mobility device that has transmitted storage location information including communication information and initial location information among storage location information of a plurality of personal mobility devices received through the communication module as a first personal mobility device;
recognize a personal mobility device that has transmitted storage location information including the initial location information but not including the communication information as a second personal mobility device;
obtain location error information based on the communication information and the initial location information of the first personal mobility device;
correct the initial location information of the second personal mobility device based on the location error information; and
transmit the corrected initial location information to the second personal mobility device;
wherein the controller is configured to correct the initial location information of the first personal mobility device based on the location error information and to transmit the corrected initial location information to the first personal mobility device, set a radius based on the location error information and weather information, set a clustering area based on the set radius and the corrected initial location information of the first personal mobility device, and correct the initial location information of the second personal mobility device in the set clustering area based on the location error information.

6. The server of claim 5, wherein the controller is configured to transmit the corrected initial location information of the first personal mobility device and the corrected initial location information of the second personal mobility device to another server for a sharing service company.

7. The server of claim 5, wherein the controller is configured to receive the weather information through the communication module.

8. The server of claim 5, wherein the controller is configured to:
determine whether there is a plurality of other first personal mobility devices within a reference distance to the first personal mobility device based on the corrected initial location information of the first personal mobility device;
in response to a determination that there is the plurality of other first personal mobility devices, obtain average location error information based on location error information of the plurality of other first personal mobility devices;
set the average location error information to location error information of a virtual first personal mobility device; and
correct the initial location information of the second personal mobility device based on the set location error information of the virtual first personal mobility device.

9. The server of claim 5 wherein the controller is configured to:
obtain information about a distance between two first personal mobility devices of the plurality of personal mobility devices with corrected initial location information based on the initial location information of the two first personal mobility devices; and
in response to the distance between the two first personal mobility devices being equal to or longer than double a preset radius based on the obtained distance information, establish a clustering area having the preset radius from a location of each of the two first personal mobility devices.

10. The server of claim 5, wherein the controller is configured to:
obtain first distance information about a distance between two first personal mobility devices of the plurality of personal mobility devices with corrected initial location information based on the initial location information of the two first personal mobility devices; and in response to the distance between the two first personal mobility devices being shorter than double a preset radius based on the obtained first distance information, establish a clustering area having a radius corresponding to the first distance information from a location of each of the two first personal mobility devices.

11. The server of claim 10, wherein, in response to an obstacle being present in the established clustering area, the controller is configured to exclude an area corresponding to the obstacle from the established clustering area.

12. The server of claim 11, wherein the communication information comprises at least one of medium access control (MAC) address information or Internet protocol (IP) address information and further comprises information about received signal strength.

13. The server of claim 12, wherein the controller is configured to:
   identify the MAC address information or the IP address information in the communication information received at the first personal mobility device;
   determine location information of an external communication device based on the MAC address information or the IP address information;
   obtain second distance information corresponding to received signal strength in the communication information received at the first personal mobility device; and
   obtain location error information for the initial location information of the first personal mobility device based on the location information of the external communication device and the second distance information.

14. The server of claim 5, wherein the controller is configured to set a maximum radius as a radius for the clustering area when parts of a plurality of clustering areas overlap.

15. The server of claim 5, wherein the controller is configured to:
   obtain average location error information based on location error information of the first personal mobility devices in two clustering areas when there is the second personal mobility device present in an overlapping region between the two clustering areas; and
   correct initial location information of the second personal mobility device in the overlapping region based on the average location error information.

16. A method of controlling a server, the method comprising:
   recognizing a personal mobility device which has transmitted storage location information including communication information and initial location information among storage location information of a plurality of personal mobility devices received through a communication module as a first personal mobility device;
   recognizing a personal mobility device which has transmitted storage location information including the initial location information and not including the communication information as a second personal mobility device;
   obtaining location error information based on the communication information and the initial location information of the first personal mobility device;
   correcting the initial location information of the second personal mobility device based on the location error information; and
   transmitting the corrected initial location information to the second personal mobility device;
   wherein correcting the initial location information of the second personal mobility device comprises:
      obtaining information about a distance between two first personal mobility devices of the plurality of personal mobility devices with corrected initial location information based on the initial location information of the two first personal mobility devices;
      establishing a clustering area based on the distance information;
      identifying the second personal mobility device present in the established clustering area; and
      correcting the initial location information of the second personal mobility device based on the location error information of the two first personal mobility devices.

17. The method of claim 16, further comprising correcting the location error information of the first personal mobility device based on weather information in response to the weather information being received through the communication module.

* * * * *